US012492595B2

(12) United States Patent
Chen

(10) Patent No.: US 12,492,595 B2
(45) Date of Patent: Dec. 9, 2025

(54) RETAINING SHEET AND VENETIAN BLIND USING THE SAME

(71) Applicant: SHEEN WORLD TECHNOLOGY CORPORATION, Taichung (TW)

(72) Inventor: Po-Yu Chen, Taichung (TW)

(73) Assignee: SHEEN WORLD TECHNOLOGY CORPORATION, Taichung (TW)

( * ) Notice: Subject to any disclaimer, the term of this patent is extended or adjusted under 35 U.S.C. 154(b) by 251 days.

(21) Appl. No.: 18/338,473

(22) Filed: Jun. 21, 2023

(65) Prior Publication Data

US 2024/0076934 A1 Mar. 7, 2024

(30) Foreign Application Priority Data

Sep. 6, 2022 (TW) ................................. 111133738

(51) Int. Cl.
*E06B 9/386* (2006.01)
*E06B 9/32* (2006.01)

(52) U.S. Cl.
CPC ..................................... *E06B 9/32* (2013.01)

(58) Field of Classification Search
CPC ............. E06B 9/32; E06B 9/384; E06B 9/386
See application file for complete search history.

(56) References Cited

U.S. PATENT DOCUMENTS 2,017,210 A * 10/1935 Kirsch .................... E06B 9/386 403/309
2,170,938 A * 8/1939 Carreras ................. E06B 9/384 160/178.1 R
2,191,602 A * 2/1940 Watts ...................... E06B 9/386 160/173 R
2,503,074 A * 4/1950 Seagaard ................ E06B 9/386 160/173 R
2,509,677 A * 5/1950 Edmonds ................ E06B 9/386 160/173 R
2,513,895 A * 7/1950 Seagaard ................ E06B 9/386 160/173 R
2,582,162 A * 1/1952 Ray ......................... E06B 9/386 160/173 R
2,633,909 A * 4/1953 Foglio ..................... E06B 9/384 160/178.3

(Continued)

FOREIGN PATENT DOCUMENTS

CN 203321285 U 12/2013

*Primary Examiner* — Johnnie A. Shablack

(74) *Attorney, Agent, or Firm* — FisherBroyles, LLP; Roger L. Browdy; Ronni S. Jillions

(57) ABSTRACT

A retaining sheet is used for retaining to a slat of a venetian blind. The slat has a through hole for penetration of a lifting cord. The retaining sheet includes a main body with an upper surface, a lower surface, a hole, and a slot. The hole and the slot pass through the upper and bottom surfaces of the main body and communicate with each other. The width of the slot is smaller than the width of the hole, wherein the main body is configured when the retaining sheet is retained to the slat of the venetian blind, the hole of the main body corresponds to the through hole of the slat, and the lifting cord is penetrated through the hole and inserted into the slot when pulled by an external force. This can prevent the lifting cord from being drawn out for enhancing the safety of use.

10 Claims, 9 Drawing Sheets

(56) References Cited

U.S. PATENT DOCUMENTS

| | | | | | |
|---|---|---|---|---|---|
| 2,732,011 | A * | 1/1956 | Evans | E06B 9/384 160/173 R |
| 2,855,990 | A * | 10/1958 | Maty | E06B 9/384 160/173 R |
| 5,176,193 | A * | 1/1993 | Yannazzone | E06B 9/384 160/168.1 R |
| 6,799,624 | B2 * | 10/2004 | Smith | E06B 9/307 160/178.3 |
| 6,877,547 | B2 * | 4/2005 | Kawakita | E06B 9/30 160/178.3 |
| 8,925,159 | B2 * | 1/2015 | Chen | E06B 9/326 24/129 R |
| 9,119,496 | B2 * | 9/2015 | Chang | E06B 9/386 |
| 9,995,082 | B2 * | 6/2018 | Hsu | E06B 9/326 |
| 11,208,841 | B2 * | 12/2021 | Anderson | E06B 9/266 |
| D988,752 | S * | 6/2023 | Chen | D6/580 |
| D988,753 | S * | 6/2023 | Chen | D6/580 |
| D1,029,623 | S * | 6/2024 | Chen | D6/580 |
| D1,029,624 | S * | 6/2024 | Chen | D6/580 |
| D1,029,625 | S * | 6/2024 | Chen | D6/580 |
| D1,029,626 | S * | 6/2024 | Chen | D6/580 |
| D1,030,361 | S * | 6/2024 | Chen | D6/580 |
| D1,030,449 | S * | 6/2024 | Chen | D6/580 |
| D1,030,465 | S * | 6/2024 | Chen | D6/580 |
| D1,061,082 | S * | 2/2025 | McBeth | D6/580 |
| 2013/0075049 | A1 * | 3/2013 | Zhang | E06B 9/386 160/236 |
| 2016/0053532 | A1 * | 2/2016 | Zhang | E06B 9/262 160/382 |
| 2019/0017317 | A1 * | 1/2019 | Anderson | E06B 9/303 |
| 2022/0018183 | A1 * | 1/2022 | Wouter | E06B 9/28 |
| 2024/0076934 | A1 * | 3/2024 | Chen | E06B 9/384 |
| 2024/0301749 | A1 * | 9/2024 | Lin | E06B 9/30 |

* cited by examiner

RETAINING SHEET AND VENETIAN BLIND USING THE SAME

BACKGROUND OF THE INVENTION

1. Field of the Invention

The present invention relates to venetian blinds and more particularly, to a retaining sheet that is retained to a slat of a venetian blind and prevents a lifting cord from being pulled out from a through hole of the slat, and a venetian blind using the aforesaid retaining sheet.

2. Description of the Related Art

Venetian blinds on the market today have a variety of styles and structures. The main function of the venetian blind is to be installed on a door or window to shade the sunlight and at the same time beautify the indoor environment. A conventional venetian blind uses a lifting cord to pass through the through holes of the slats, such that the slats can be folded or unfolded by controlling the lifting cord. However, a gap is provided between the two adjacent slats, such that the lifting cord exposed through the gap may be pulled out by children to form a rope loop. Because the through hole of the slat penetrated by the lifting cord has two arc-shaped closed ends, the movement of the lifting cord can't be limited, such that the lifting cord may be drawn out continuously. This will cause the rope loop to be enlarged. As a result, the neck of children may be easily wrapped by the enlarged rope loop, and therefore mild cases cause strangulation, and severe cases even lead to death from suffocation.

In order to solve the aforesaid problem, the venetian blind disclosed by CN 203321285 provides a clamping groove connected with each of two ends of the through hole. The width of the clamping groove is smaller than the diameter of the lift cord. The movement of the lift cord is limited by the clamping groove to prevent the rope loop from being enlarged continuously. However, the conventional slat is mostly made by PVC. When the lifting cord and the through hole rub against each other in a long time, the lifting cord gets damaged easily because of touching the edge of the through hole, and the through hole is easy to be enlarged because of touching the lifting cord. The enlarged hole causes the lifting cord to be easily drawn out. In addition, it is difficult to machine the clamping groove. If the thin and long clamping groove is machined on the slat, the structural strength of the slat is damaged, and further, when a thicker slat is used, the thin and long clamping groove is difficult to be machined. This leads to a decrease in the yield of the slat. Therefore, there is still room for improvement within the aforesaid prior art.

SUMMARY OF THE INVENTION

It is a primary objective of the present invention to provide a retaining sheet, which is configured to a slat of a venetian blind, such that a lift cord can be effectively limited to be drawn out continuously, and further, when the retaining sheet is assembled with the slat, the lifting cord and the through holes can be prevented from rubbing against each other to reduce wear of the lifting cord and enlargement of the through hole and keep the structural strength of the slat the same without affecting the yield of the slat.

To attain the above objective, the retaining sheet is retained to the slat of venetian blind. The slat has a through hole for penetration of the lifting cord. The retaining sheet comprises a main body provided with an upper surface, a lower surface, a hole, and a slot. The hole and the slot are penetrated through the upper and lower surfaces and communicate with each other, and further, the width of the slot is smaller than the width of the hole, wherein the main body is configured when the retaining sheet is retained to the slat, the hole of the main body corresponds to the through hole of the slat, and the lifting cord is penetrated through the hole and inserted into the slot when pulled by an external force.

It can be seen from the above that when the lifting cord is inserted into the slot, the lifting cord is limited by the slot so as not to be drawn out continuously. This can prevent a rope loop formed by the pulling lifting cord from being enlarged continuously, thereby enhancing the safety of use. Moreover, when the retaining sheet is configured to the slat, the lifting cord does not touch the edge of the through hole so as to prevent the lift cord and the edge of the through hole from rubbing against each other, thereby reduce wear of the lifting cord and enlargement of the through hole. In addition, since the slot is provided at the retaining sheet, it is unnecessary for the slat to machine the slot, and therefore, the structural strength of the slat can be kept the same without affecting the yield of the slat.

Preferably, the retaining sheet further comprises at least one hook extending integrally outwards from the main body for hooking to the slat. In this way, the retaining sheet is detachably disposed to the slat so as to be easily assembled and disassembled.

Preferably, the retaining sheet further comprises a plurality of hooks disposed at two opposite sides of the main body and each having a parallel portion connected to the main body and a curved body portion connected to the parallel portion for hooking to a side edge of the slat. In this way, the retaining sheet uses the curved body portions to hook two opposite side edges of the slat, such that the retaining sheet is firmly retained to the slat.

Preferably, the hole has a front side edge, a rear side edge, a left side edge, and a right side edge. The main body comprises a plurality of said slots extending away from the hole and disposed at the front and rear side edges of the hole or the left and right side edges of the hole. In this way, when the lifting cord is pulled by the external force to move towards the front, rear, left, and right of the hole, the lifting cord is inserted into one of the slots.

Preferably, the slots extend inclinedly away from the hole or extend along a direction parallel to an extending direction of the hole or extend curvedly along the extending direction of the hole or extend along the extending direction of the hole in a manner that are parallel to each other and staggered left and right or extend away from the hole along a direction vertical to the extending direction of the hole. In this way, the slots have different structural changes to provide different styles for users to choose.

To attain the above objective, the present invention provides a venetian blind using the aforesaid retaining sheet. The venetian blind comprises an upper rail, a bottom rail, a plurality of slats, a lifting cord, and a retaining sheet disposed to one of the slats. The slats are arranged between the upper and bottom rails and each have a through hole. The lifting cord passes through the through holes of the slats and has two ends thereof connected to the upper and bottom rails. The hole of the retaining sheet corresponds to the through hole of the slat. The lifting cord is penetrated through the hole and inserted into the slot when pulled by an external force.

It can be seen from the above that the lifting cord is inserted into the slot when pulled by the external force. The lifting cord is limited by the slot so as not to be drawn out continuously, such that the problem that a rope loop formed by the pulling lifting cord is enlarged continuously can be solved.

Preferably, the diameter of the slot is smaller than the diameter of the hole. In this way, when the lifting cord passes through the hole and the through hole, the lifting cord does not touch the edge of the hole.

Preferably, the slats each have an insertion concavity, and the retaining sheet further comprises an insertion convexity extending integrally downwards from the main body and inserted into the insertion concavity of one of the slats. In this way, the retaining sheet is tightly fixed on the slat.

Other advantages and features of the present invention will be fully understood by reference to the following specification in conjunction with the accompanying drawings, in which like reference signs denote like components of structure.

DETAILED DESCRIPTION OF THE INVENTION

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in the contents of the specification, such as 'front', 'on', 'down', 'rear', 'left', 'right', 'top', 'bottom', 'inside', and 'outside', are also just for illustrative description on the basis of normal usage direction, not intended to limit the claimed scope.

Figure 1:
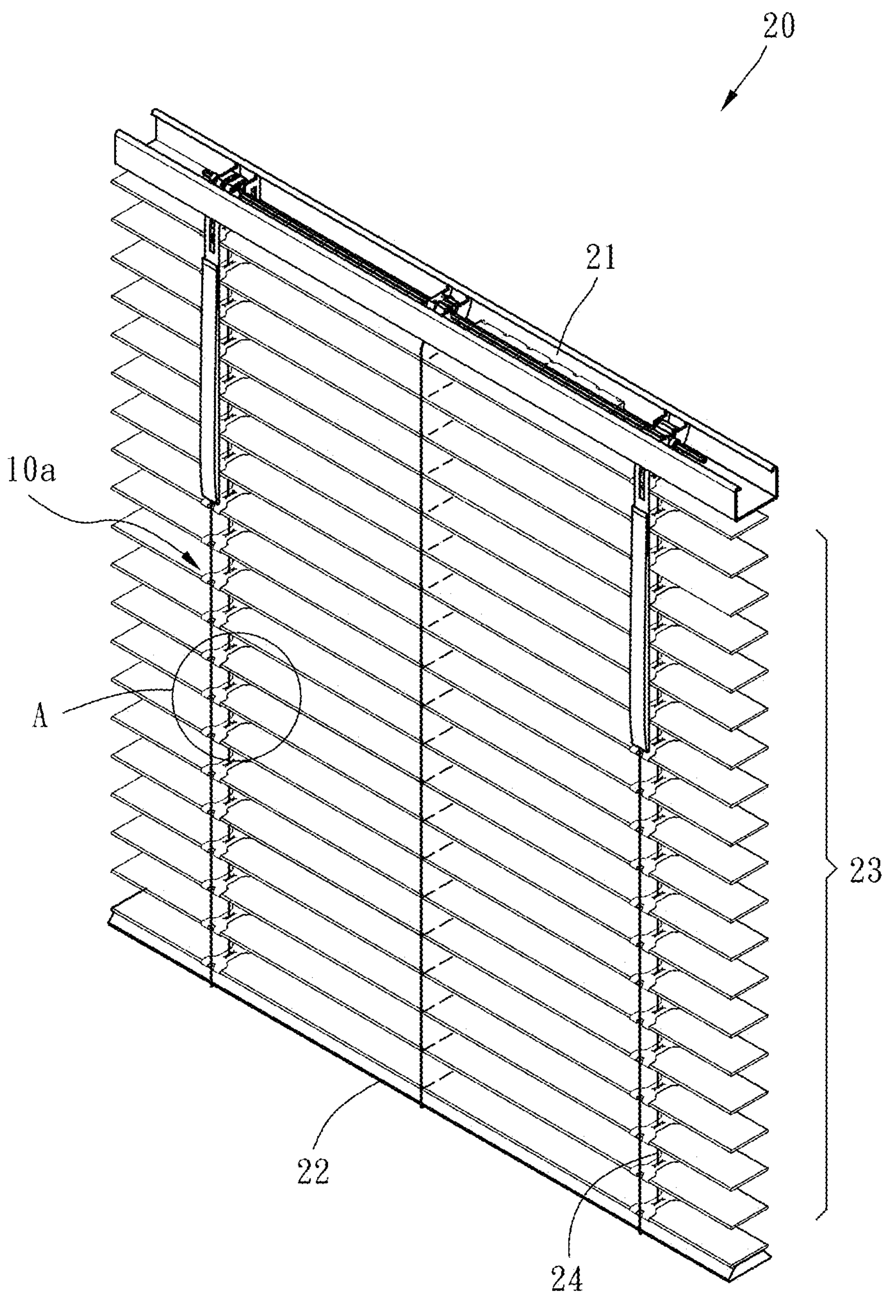
FIG. 1 is a perspective view of a venetian blind using a retaining sheet of a first embodiment of the present invention.
Figure 2:
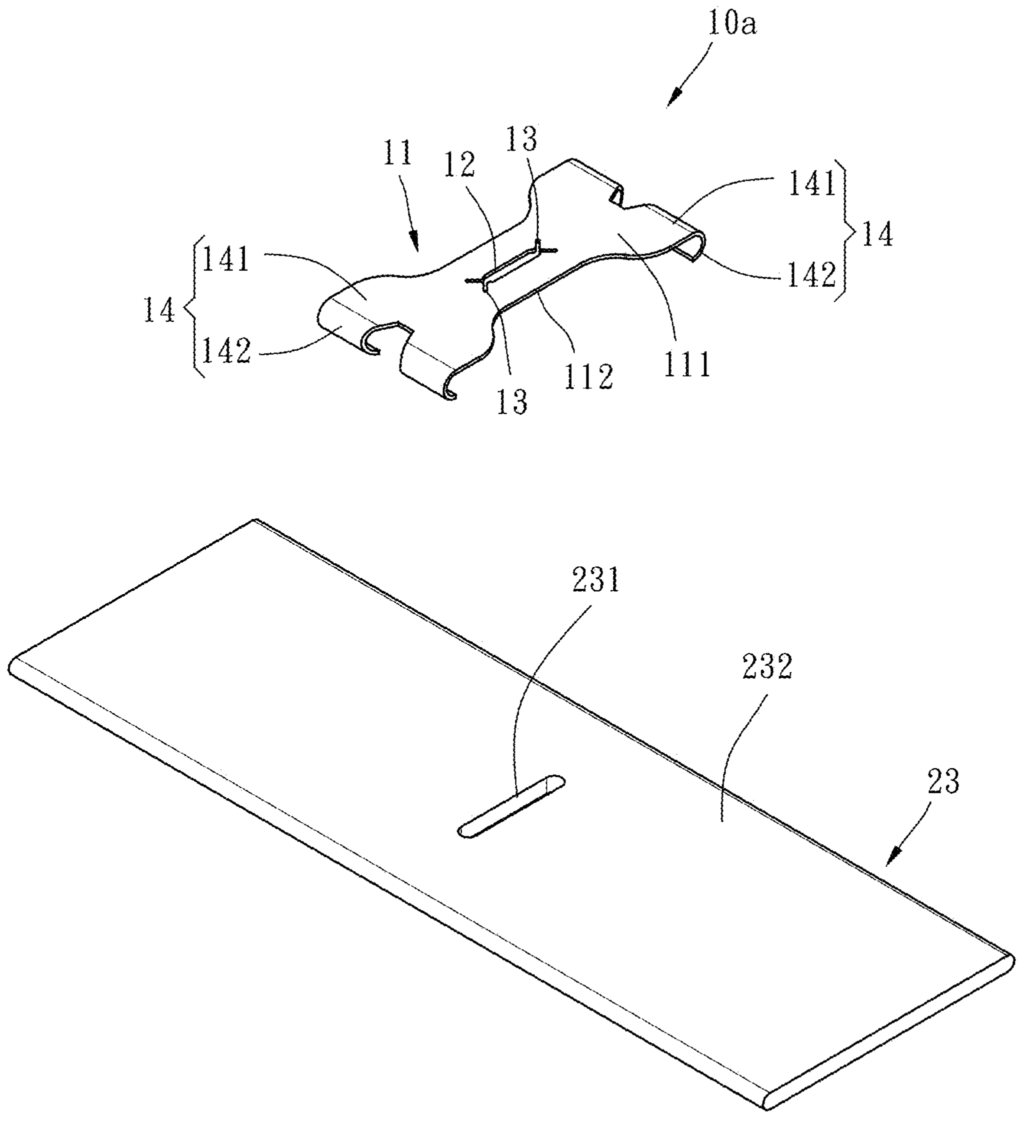
FIG. 2 is an exploded view of a slat and the retaining sheet of the first embodiment of the present invention.

Referring to FIG. 1, a venetian blind 20 shown in FIG. 1 comprises an upper rail 21, a bottom rail 22, a plurality of slats 23, two lifting cords 24, and a plurality of retaining sheets 10*a*. The slats 23 are positioned between the top and bottom rails 21, 22 in a horizontal manner, and two ends of the slats 23 each have a through hole 231 (as shown in FIG. 2). The lifting cords 24 pass through the through holes 231 of the slats 23 and each have two ends thereof connected to the top and bottom rails 21, 22. The retaining sheets 10*a* are configured to two ends of the slats 23 in pairs.

Figure 3:
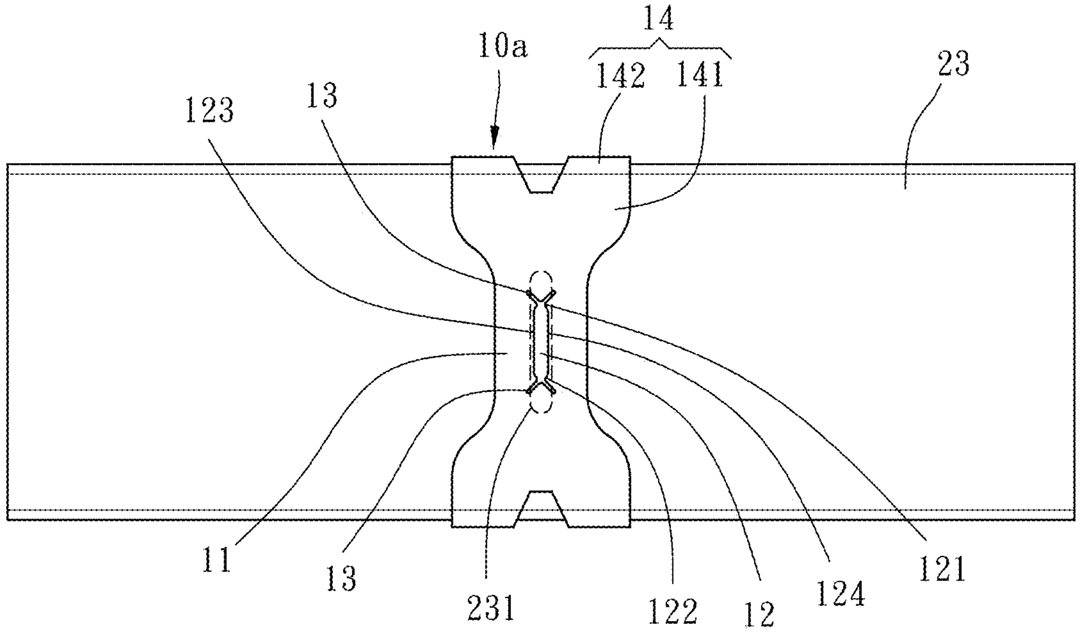
FIG. 3 is a top view of the slat and the retaining sheet of the first embodiment of the present invention.

As shown in FIG. 2, the retaining sheet 10*a* provided by the first embodiment of the present invention is made of plastic by one-piece molding, comprising a main body 11 and four hooks 14. In detail, the main body 11 includes an upper surface 111, a lower surface 112, a hole 12, and four slots 13. The hole 12 and the slots 13 are penetrated through the upper and lower surface 111, 112 and communicate with each other. As shown in FIG. 3, the hole 12 has a front side edge 121, a rear side edge 122, a left side edge 123, and a right side edge 124. The width of the slot 13 is smaller than the width of the hole 12. The slots 13 are provided spacedly at the front and rear side edges 121, 122 of the hole 12 in pairs and extend inclinedly away from the hole 12. As shown in FIG. 2, the hooks 14 are provided at two opposite sides of the main body 11 in pairs, and each have a parallel portion 141 connected to the main body 11 and a curved body portion 142 connected to the parallel portion 141.

The above descriptions are the structural features of the retaining sheet 10*a*. The following descriptions further introduce how to configure the retaining sheet 10*a* to the venetian blind 20 and the effect of configuring the retaining sheet 10*a* to the venetian blind 20.

Figure 4:
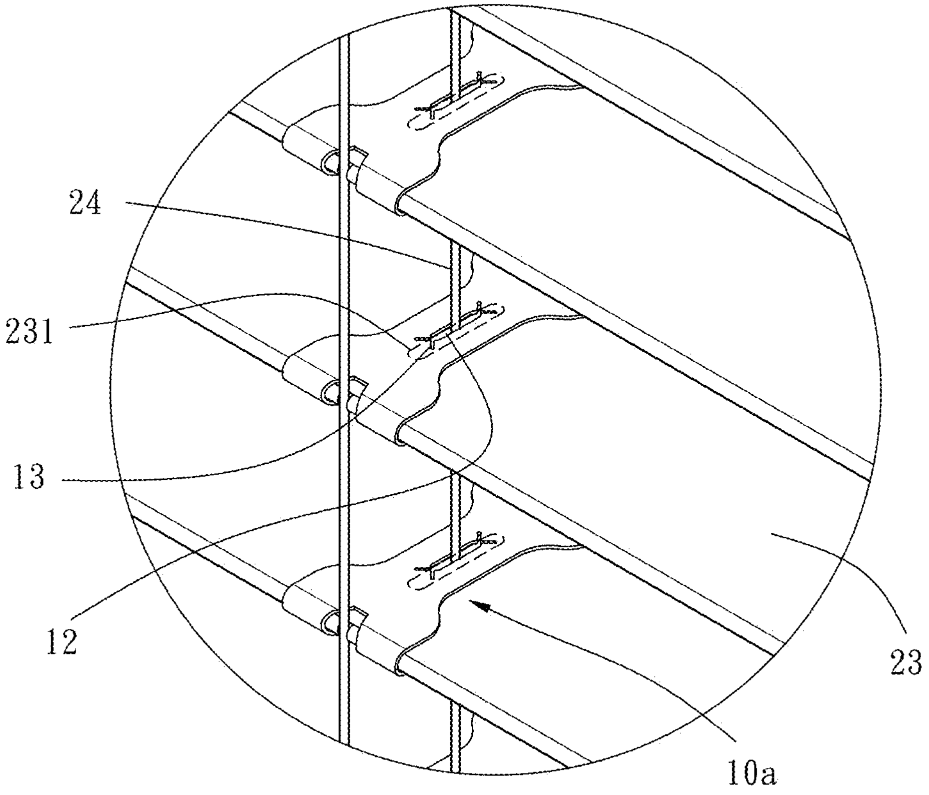
FIG. 4 is an enlarged view of part A of FIG. 1.
Figure 5:
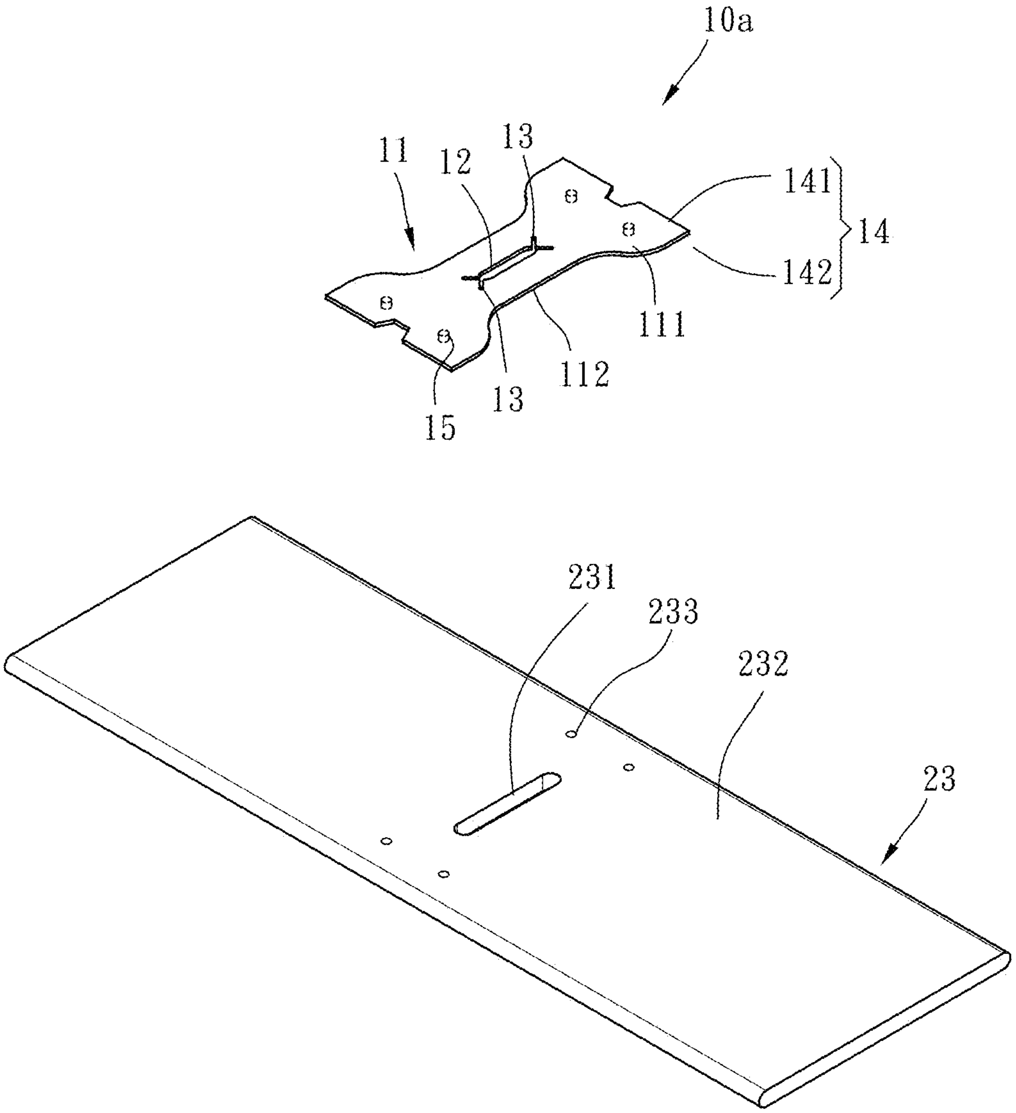
FIG. 5 is an exploded view of the slat and the retaining sheet of the first embodiment of the present invention, showing that the slat has four insertion concavities, and the retaining sheet has four insertion convexities.

As shown in FIGS. 2 and 3, the retaining sheet 10*a* is configured to the slat 23 from one end of the slat 23. At this time, the lower surface 112 of the main body 11 and the parallel portion 141 of the hook 14 are abutted against a top surface 232 of the slat 23, and the curved body portion 142 of the hook 14 is hooked to one side edge of slat 23. Then, the retaining sheet 10*a* is moved until the hole 12 of the main body 11 corresponds to the through hole 231 of the slat 23. Thereafter, the lifting cord 24 is allowed to pass through the hole 12 and the through hole 231, as shown in FIG. 4, for completing the assembly of the retaining sheet 10*a* and the slat 23. What needs to be added here is that since the diameter of the hole 12 is smaller than the diameter of the through hole 231, the lifting cord 24 does not touch the edge of the through hole 231 when passing through the hole 12 and the through hole 231 to prevent the through hole 231 from being enlarged. Moreover, the configuration of the retaining sheet 10*a* and the slat 23 is not limited to this embodiment. For example, as shown in FIG. 5, four insertion concavities 233 are machined on the upper surface 232 of the slat 23, and four insertion convexities 15 extending downwards from the main body 11 are substituted for the hooks 14. The insertion convexities 15 of the retaining sheet 10*a* are inserted into the insertion concavities 233 of the slat 23 to achieve the effect of assembling the retaining sheet 10*a* to the venetian blind 20. In fact, the retaining sheet 10*a* is assembled with the slat 23 by using one insertion convexity 15 and one insertion concavity 233. However, this embodiment uses the hooks 14 to detachably assemble with the slat 23, which has the advantage of convenient assembly.

Figure 6:
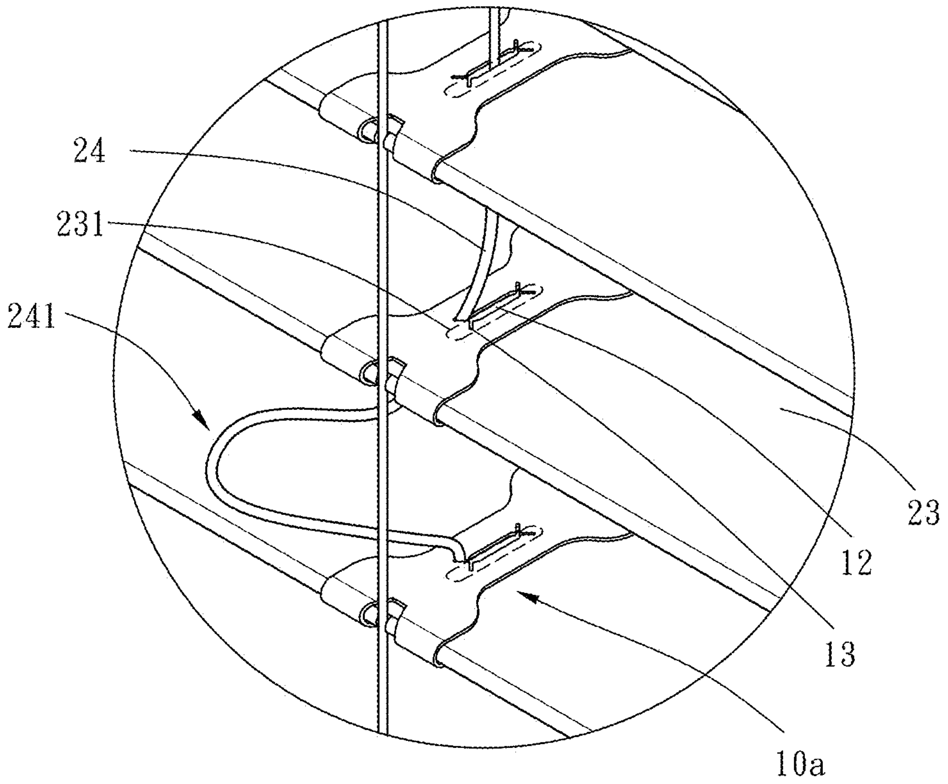
FIG. 6 is similar to FIG. 4, showing that a lifting cord is pulled out through a gap between the two adjacent slats to form a rope loop provided with two ends inserted into the slot.

It can be seen from the above that when the lifting cord 24 is drawn out by an external force through a gap between the two adjacent slats 23, as shown in FIG. 6, the lifting cord 24 is moved along the extending direction of the hole 12 towards the upper right, lower right, upper left or lower left of the hole 12 and then inserted into one of the slots 13. At this time, the lifting cord 24 is limited by the slot 13 so as not to be drawn out continuously. This can prevent a rope loop 241 formed by the pulling lifting cord 24 from being enlarged continuously, thereby enhancing the safety of use. Moreover, since the slot 13 is provided at the retaining sheet 10*a*, it is unnecessary for the slat 23 to machine the slot 13, such that the structural strength of the slat 23 can be kept the same without affecting the yield of the slat 23.

Figure 7:
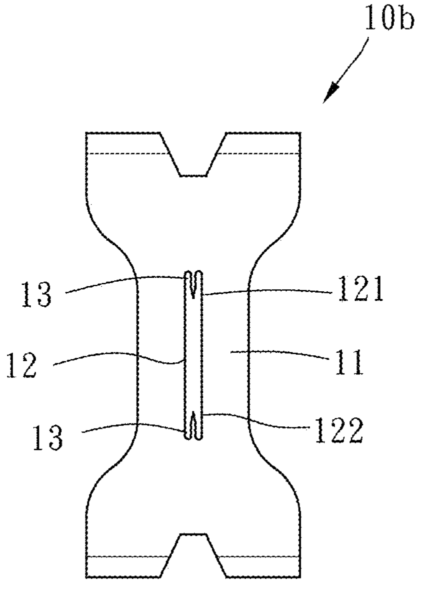
FIG. 7 is a top view of the retaining sheet of the second embodiment of the present invention.
Figure 8:
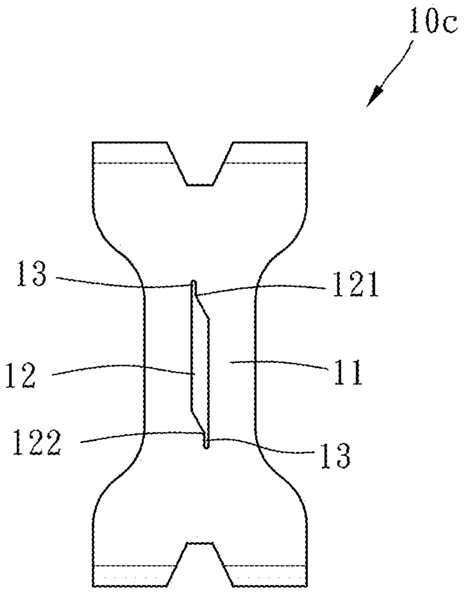
FIG. 8 is a top view of the retaining sheet of the third embodiment of the present invention.
Figure 9:
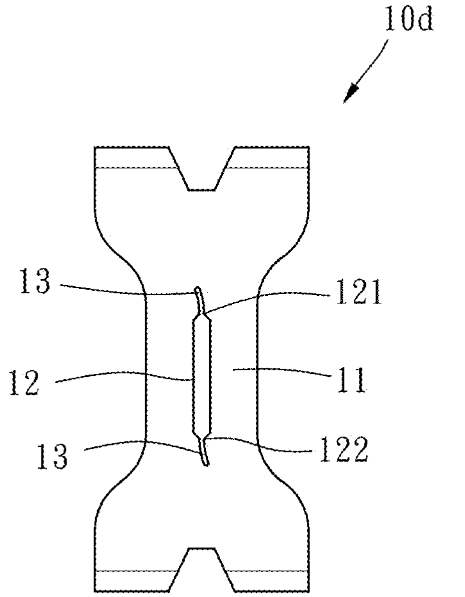
FIG. 9 is a top view of the retaining sheet of the fourth embodiment of the present invention.

On the other hand, the retaining sheet 10*a* of the first embodiment invention has four slots 13. However, in fact, the slot 13 can have different structural changes to provide different styles for users to choose. As shown in FIG. 7, the retaining sheet 10*b* of the second embodiment invention also has four slots 13 arranged spacedly at the front and rear side edges 121, 122 of the hole 12 in pairs. Each slot 13 extends away from the hole 12 along a direction parallel to the extending direction of the hole 12. As shown in FIG. 8, the retaining sheet 10*c* of the third embodiment invention has two slots 13 arranged parallel to each other and staggered left and right. One of the slots 13 extends from the front side edge 121 of the hole towards a direction away from the hole 12 along a direction parallel to the extending direction of the hole 12. The other of the slots 13 extends from the rear side edge 122 of the hole 12 towards a direction away from the hole 12 along a direction parallel to the extending direction of the hole 12. As shown in FIG. 9, the retaining sheet 10*d* of the fourth embodiment invention has two slots 13 extending curvedly outwards from the front and rear side edges 121, 122 of the hole 12.

Figure 10:
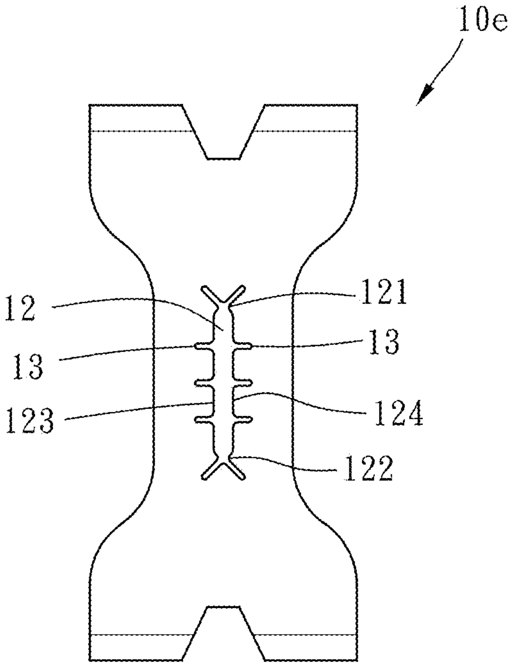
FIG. 10 is a top view of the retaining sheet of the fifth embodiment of the present invention.
Figure 11:
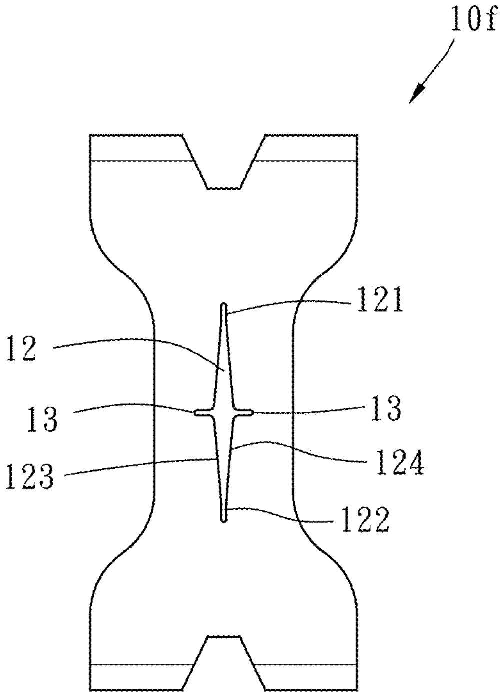
FIG. 11 is a top view of the retaining sheet of the sixth embodiment of the present invention.
Figure 12:
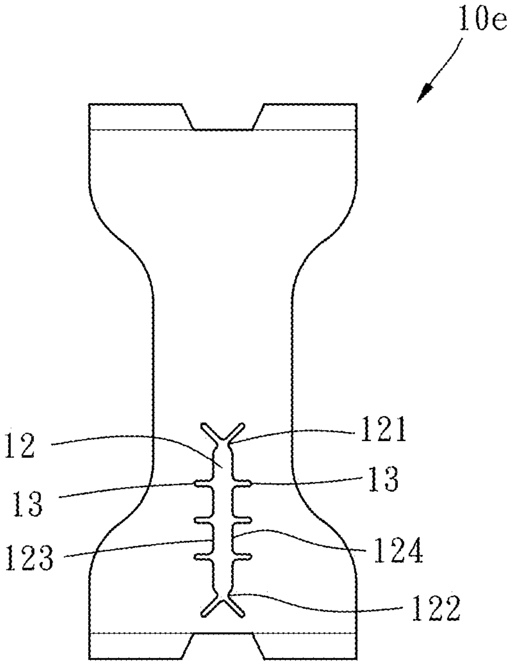
FIG. 12 is similar to FIG. 10, showing that the hole and the slot are provided at one side of the main body.
Figure 13:
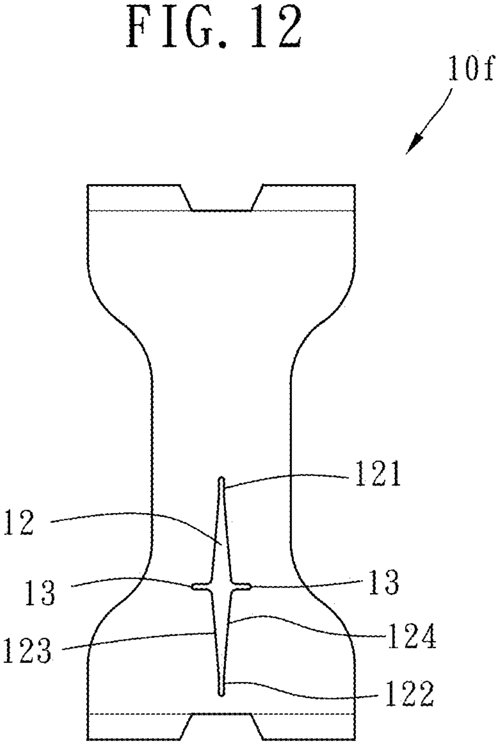
FIG. 13 is similar to FIG. 11, showing that the hole and the slot are provided at one side of the main body.

In addition, the slot 13 also can be provided at the left and right side edges 123, 124 of the hole 12 and extend away from the hole 12 along a direction vertical to the extending direction of the hole 12. As shown in FIG. 10, the retaining sheet 10*e* of the fifth embodiment invention has six slots 13 extending left and right and two pairs of the slots 13 extending inclinedly (i.e., the slots 13 provide by the first embodiment). However, in fact, the six slots 13 extending left and right can be combined with the slots 13 provided by the second, third, and fourth to create different styles. As shown in FIG. 11, the retaining sheet 10*f* of the sixth embodiment has four slots 13. Two of the slots 13 are provided at the front and rear side edges 121, 122 of the hole 12 and extend away from the hole 12 along a direction parallel to the extending direction of the hole 12. The other two of the slots 13 are provided at the left and right side edges 121, 122 of the hole 12 and extend away from the hole 12 along a direction vertical to the extending direction of the hole 12. What needs to be added here is that the venetian blind 20 is installed indoors, so when the lifting cord 24 is pulled by a user to fold or unfold the slats 23, the direction in which the lifting cord 24 is pulled is closer to indoors. Therefore, as shown in FIGS. 12 and 13, the retaining sheet 10*e* of the fifth embodiment and the retaining sheet 10*f* of the sixth embodiment also can set the holes 12 and the slots 13 to the side of the main body 11 close to indoors, such that the lifting cord 24 is easier to be inserted into one of the slots 13 for enhancing the safety of use.

The assembly way and effect of the retaining sheets 10*b*, 10*c*, 10*d*, 10*e*, 10*f* of the second, third, fourth, fifth, and sixth embodiments are the same as those of the retaining sheet 10*a* of the first embodiment, so the detailed configuration will not be repeatedly mentioned hereunder.

What is claimed is:

1. A retaining sheet for retaining to a slat of a venetian blind, the slat having a through hole for penetration of a lifting cord, the retaining sheet comprising:
 a main body having an upper surface, a lower surface opposite to the upper surface, a hole passing through the upper and lower surfaces, and a slot passing through the upper and lower surfaces and communicating with the hole and having a width smaller than a width of the hole;
 wherein the main body is configured when the retaining sheet is retained to the slat of the venetian blind, the hole of the main body corresponds to the through hole of the slat, and the lifting cord is penetrated through the hole and the through hole and inserted into the slot when pulled by an external force;
 wherein the hole has a front side edge, a rear side edge, a left side edge, and a right side edge, and the main body comprises a plurality of said slots extending away from the hole and disposed at the front and rear side edges of the hole or the left and right side edges of the hole.

2. The retaining sheet as claimed in claim 1, further comprising at least one hook extending integrally outwards from the main body for hooking to the slat.

3. The retaining sheet as claimed in claim 2, further comprising a plurality of hooks disposed at two opposite sides of the main body and each having a parallel portion connected to the main body and a curved body portion connected to the parallel portion for hooking to a side edge of the slat.

4. The retaining sheet as claimed in claim 1, wherein the slots extend inclinedly away from the hole or extend along a direction parallel to an extending direction of the hole or extend curvedly along the extending direction of the hole or extend along the extending direction of the hole in a manner that are parallel to each other and staggered left and right or extend away from the hole along a direction vertical to the extending direction of the hole.

5. A venetian blind comprising:
 a top rail;
 a bottom rail;
 a plurality of slats positioned between the top and bottom rails and each having a through hole;
 a lifting cord passing through the through holes of the slats and having two ends thereof connected to the top and bottom rails; and
 a retaining sheet comprising a main body having an upper surface, a lower surface opposite to the upper surface, a hole passing through the upper and lower surfaces, and a slot passing through the upper and lower surfaces and communicating with the hole and having a width smaller than a width of the hole, wherein the retaining sheet is retained to one of the slats and the hole corresponds to the through hole of the slat, and the lifting cord is penetrated through the hole and inserted into the slot when pulled by an external force;
 wherein the hole has a front side edge, a rear side edge, a left side edge, and a right side edge, and the retaining sheet comprises a plurality of said slots extending away from the hole and disposed at the front and rear side edges of the hole or the left and right side edges of the hole.

6. The venetian blind as claimed in claim 5, wherein the retaining sheet further comprises at least one hook extending integrally outwards from the main body and hooked to the slat.

7. The venetian blind as claimed in claim 6, wherein the retaining sheet comprises a plurality of hooks disposed at two opposite sides of the main body and each having a parallel portion connected to the main body and a curved body portion connected to the parallel portion and hooked to a side edge of the slat.

8. The venetian blind as claimed in claim 5, wherein the slots extend inclinedly away from the hole or extend along a direction parallel to an extending direction of the hole or extend curvedly along the extending direction of the hole or extend along the extending direction of the hole in a manner that are parallel to each other and staggered left and right or extend away from the hole along a direction vertical to the extending direction of the hole.

9. The venetian blind as claimed in claim 5, wherein a diameter of the hole is smaller than a diameter of the through hole.

10. The venetian blind as claimed in claim 5, wherein the slats each have an insertion concavity, and the retaining sheet further comprises an insertion convexity extending integrally downwards from the main body and inserted into the insertion concavity of one of the slats.

* * * * *